US008469010B2

(12) United States Patent
Inoue

(10) Patent No.: US 8,469,010 B2
(45) Date of Patent: Jun. 25, 2013

(54) CONTROL DEVICE FOR INTERNAL COMBUSTION ENGINE AND MEASURING DEVICE OF MASS FLOW RATE OF NOX RECIRCULATED TO INTAKE PASSAGE WITH BLOWBY GAS

(75) Inventor: Masahiro Inoue, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 416 days.

(21) Appl. No.: 13/000,046

(22) PCT Filed: Jan. 28, 2010

(86) PCT No.: PCT/JP2010/051153

§ 371 (c)(1), (2), (4) Date: Dec. 20, 2010

(87) PCT Pub. No.: WO2011/092823

PCT Pub. Date: Aug. 4, 2011

(65) Prior Publication Data

US 2011/0282539 A1 Nov. 17, 2011

(51) Int. Cl.

*F02D 41/00* (2006.01)
*G01M 15/04* (2006.01)
*F02B 47/08* (2006.01)

(52) U.S. Cl.

USPC ...................................... 123/698; 123/568.14

(58) Field of Classification Search

USPC 123/698, 672, 703, 568.11, 568.14; 701/101, 701/102, 103, 108, 109, 114; 60/276, 278, 60/285

See application file for complete search history.

(56) References Cited

U.S. PATENT DOCUMENTS 5,154,156 A * 10/1992 Ohuchi .................... 123/568.16
5,482,020 A * 1/1996 Shimizu et al. ................. 60/278
5,540,091 A * 7/1996 Nakagawa ................. 73/114.74
6,763,708 B2 * 7/2004 Ting et al. .................. 73/114.74
7,107,143 B2 * 9/2006 Kang ............................ 701/114
7,267,117 B2 * 9/2007 Tonetti et al. ............ 123/568.11

FOREIGN PATENT DOCUMENTS

JP 2005-090368 A 4/2005
JP 2005-207367 A 8/2005
JP 2006-138242 A 6/2006
JP 2009-156239 A 7/2009
JP 2009-293496 A 12/2009

* cited by examiner

*Primary Examiner* — Hieu T Vo
(74) *Attorney, Agent, or Firm* — Kenyon & Kenyon LLP

(57) ABSTRACT

A mass flow rate of NOx which is recirculated to an intake passage with a blowby gas is obtained with high precision, and based on the result, a state of an internal combustion engine can be accurately diagnosed. A control device for an internal combustion engine of the present invention measures a NOx concentration in an intake passage downstream from a position where the blowby gas is recirculated, and similarly measures an oxygen concentration in the intake passage downstream from the aforesaid position. Further, the control device measures a mass flow rate of fresh air taken into the intake passage. The control device calculates a mass flow rate of the blowby gas recirculated to the intake passage from the oxygen concentration and the mass flow rate of the fresh air. Next, the control device calculates a mass flow rate of all gases in the intake passage from the mass flow rate of the fresh air and the mass flow rate of the blowby gas. Subsequently, the control device calculates the mass flow rate of NOx in the aforesaid intake passage from the mass flow rate of all the gases and the NOx concentration. The present control device diagnoses the state of the internal combustion engine based on the mass flow rate of NOx thus calculated.

9 Claims, 3 Drawing Sheets

CONTROL DEVICE FOR INTERNAL COMBUSTION ENGINE AND MEASURING DEVICE OF MASS FLOW RATE OF NOX RECIRCULATED TO INTAKE PASSAGE WITH BLOWBY GAS

TECHNICAL FIELD

The present invention relates to a control device for an internal combustion engine with a blowby gas recirculated to an intake passage, and a measuring device of a mass flow rate of NOx which is recirculated to the intake passage with the blowby gas, which is preferable for use in such a control device.

BACKGROUND ART

Inside an internal combustion engine, a blowby gas occurs, which blows into a crankcase from a gap between a cylinder and a piston. A blowby gas contains an unburned HC component in a high concentration, and therefore, the blowby gas is not directly released into the atmosphere. In an ordinary internal combustion engine, a blowby gas is recirculated to an intake passage and is treated by re-combustion.

A blowby gas contains NOx generated by combustion. Therefore, depending on the concentration of NOx contained in the blowby gas, combustion of the internal combustion engine is likely to become worse when the blowby gas is recirculated to the intake passage. With regard to the problem, Japanese Patent Laid-Open No. 2006-138242 proposes to measure the NOx concentration of a blowby gas by a NOx sensor attached to a blowby gas recirculation passage, and stop the recirculation of the blowby gas to the intake passage when the NOx concentration exceeds an allowable limit.

Incidentally, a blowby gas has the characteristic of reducing the lubricating performance of an internal combustion engine by reacting with oil and a fuel. The main factor of the characteristic is NOx contained in a blowby gas. NOx causes polymerization reaction with oil and a fuel, and thereby, sludge is generated. The sludge generated in a crankcase degrades the lubricating characteristic of oil. Meanwhile, when the blowby gas is recirculated to an intake passage, sludge is generated in the intake passage by polymerization reaction of NOx and oil or a fuel. The sludge becomes a deposit and accumulates in the intake passage to worsen the intake efficiency of the internal combustion engine.

The generation amount of sludge correlates with the mass of NOx existing in a space around oil and a fuel. Accordingly, in performing suitable control by accurately diagnosing the state of the internal combustion engine, the mass of NOx can be said as important information. The mass of NOx in the crankcase can be represented by the NOx concentration in the crankcase. This is because the pressure and the volumetric capacity are constant in the crankcase, and there is no change in the mass of all the gases in the crankcase. Meanwhile, the mass (in detail, a mass flow rate) of NOx in the intake passage cannot be represented by the NOx concentration because in the intake passage, change of the pressure is large, and the mass flow rate of all the gases significantly changes. In order to diagnose the generation situation of the sludge in the intake passage, the mass flow rate itself of NOx which is recirculated to the intake passage with the blowby gas needs to be measured.

However, the method for accurately obtaining the mass flow rate of NOx in the intake passage has not been proposed so far. As described above, Japanese Patent No. 2006-138242 indicates that a sensor is disposed in the blowby gas recirculation passage to measure the NOx concentration, but mentions nothing about measurement of the mass flow rate of NOx. If the mass flow rate of NOx is obtained on the precondition of the art described in the publication, the mass flow rates of all blowby gases are needed as information. This is because the value obtained by multiplying the mass flow rates of all the blowby gases by the NOx concentration is the mass flow rate of NOx. However, the blowby gas recirculation passage is extremely slim as compared with the intake passage; and therefore, it is difficult to provide a mass flowmeter such as an air flowmeter. Further, there is a problem in attaching the NOx sensor to the blowby gas recirculation passage. Not only the circulation of the blowby gas is likely to be inhibited by the pressure loss increased by installment of the NOx sensor, but also measurement itself is unlikely to be accurately performed due to the influence of moisture.

SUMMARY OF INVENTION

The present invention is made to solve the problems as described above, and has an object to obtain a mass flow rate of NOx, which is recirculated to an intake passage with a blowby gas, with high precision, and to be able to diagnose a state of an internal combustion engine accurately based on the result.

For this purpose, the present invention provides a control device of an internal combustion engine as follows.

A control device of the present invention is a control device for an internal combustion engine in which a blowby gas is recirculated to an intake passage. The present control device measures a NOx concentration in the intake passage downstream from a position where the blowby gas is recirculated, and similarly measures an oxygen concentration in the intake passage downstream from the position. A NOx sensor can be used for measurement of the NOx concentration. The oxygen concentration can be also measured by using the same NOx sensor. Further, the present control device measures a mass flow rate of fresh air taken into the intake passage.

The present control device obtains the mass flow rate of NOx in the intake passage by calculation based on the above three kinds of measurement values. First, the present control device calculates the mass flow rate of the blowby gas recirculated to the intake passage from the oxygen concentration and the mass flow rate of the fresh air. Next, the control device calculates a mass flow rate of all gases in the intake passage from the mass flow rate of the fresh air and the mass flow rate of the blowby gas. Subsequently, the control device calculates the mass flow rate of NOx in the intake passage from the mass flow rate of all gases and the NOx concentration. The present control device diagnoses the state of the aforesaid internal combustion engine based on the mass flow rate of NOx thus calculated.

As a diagnosis method, comparison of the mass flow rate of NOx with a predetermined threshold value is cited. For example, when the mass flow rate of NOx is a predetermined value which is an allowable limit or more, it can be diagnosed that sludge is easily generated by polymerization reaction of NOx and oil or a fuel. In this case, the actuator of the internal combustion engine is preferably operated to reduce generation of NOx. In this manner, the sludge generated by the polymerization reaction of NOx and oil or a fuel can be suppressed from accumulating in the intake passage as a deposit.

The present control device can perform air-fuel ratio feedback control of calculating a fuel injection amount from the mass flow rate of the fresh air and the target air-fuel ratio, and calculating a correction amount of the fuel injection amount from the deviation of the exhaust air-fuel ratio and the target air-fuel ratio. If the air-fuel ratio feedback control is performed, when the mass flow rate of NOx is the predetermined value or less, the state of the aforesaid internal combustion engine can be diagnosed by determining whether or not the reduction correction amount of the fuel injection amount is not less than the predetermined value. In concrete, fuel dilution of oil can be diagnosed as the state of the internal combustion engine. When the fuel dilution of oil advances, the amount of HC evaporated from oil in the crankcase increases. Consequently, polymerization reaction of NOx and HC in the crankcase is promoted, and as a result, the amount of NOx in the crankcase becomes small, and the mass flow rate of NOx which is recirculated to the intake passage reduces. The reduction correction amount of the fuel injection amount becomes larger as the amount of HC contained in the blowby gas is larger, that is, the amount of HC evaporated from oil in the crankcase is larger. Accordingly, if the reduction correction amount of the fuel injection amount becomes large simultaneously with reduction in the mass flow rate of NOx, it can be determined that the fuel dilution of oil is advancing in the internal combustion engine. Meanwhile, if the reduction correction amount of the fuel injection amount does not become large though the mass flow rate of NOx becomes low, it can be determined that there is the possibility of another cause, for example, an abnormality in the fuel system.

Further, for the above described purpose, the present invention also provides a measuring device as follows.

The measuring device of the present invention is a device which measures the mass flow rate of NOx which is recirculated to the intake passage with a blowby gas in the internal combustion engine in which the blowby gas is recirculated to the intake passage. The present measuring device is configured by two sensors and a signal processing device which processes the signals of them. One of the sensors is a NOx sensor attached to a downstream side from the position where the blowby gas is recirculated, of the intake passage, and the other sensor is an air flowmeter which is attached to an inlet port of the intake passage.

From the signal of the NOx sensor, the NOx concentration and the oxygen concentration in the intake passage can be obtained. From the signal of the air flowmeter, the mass flow rate of the fresh air taken into the intake passage can be obtained. The signal processing device converts the signal of the NOx sensor into the NOx concentration by a NOx concentration measuring unit, and converts the signal of the NOx sensor into an oxygen concentration by an oxygen concentration measuring unit. Further, the signal processing device converts the signal of the air flowmeter into a mass flow rate of fresh air by a fresh air mass flow rate measuring unit.

The signal processing device calculates a mass flow rate of NOx in the intake passage by calculation based on the above three kinds of measurement values. First, in a blowby gas mass flow rate calculating unit, the mass flow rate of the blowby gas recirculated to the intake passage is calculated from the oxygen concentration and the mass flow rate of the fresh air. Next, in an all gas mass flow rate calculating unit, the mass flow rate of all gases in the intake passage is calculated from the mass flow rate of the fresh air and the mass flow rate of the blowby gas. Subsequently, in a NOx mass flow rate calculating unit, the mass flow rate of NOx in the intake passage, that is, the mass flow rate of NOx recirculated to the intake passage with the blowby gas is calculated from the mass flow rate of all gases and the NOx concentration.

DESCRIPTION OF EMBODIMENTS

Hereinafter, an embodiment of the present invention will be described with reference to each of FIGS. 1 to 3.

Figure 1:
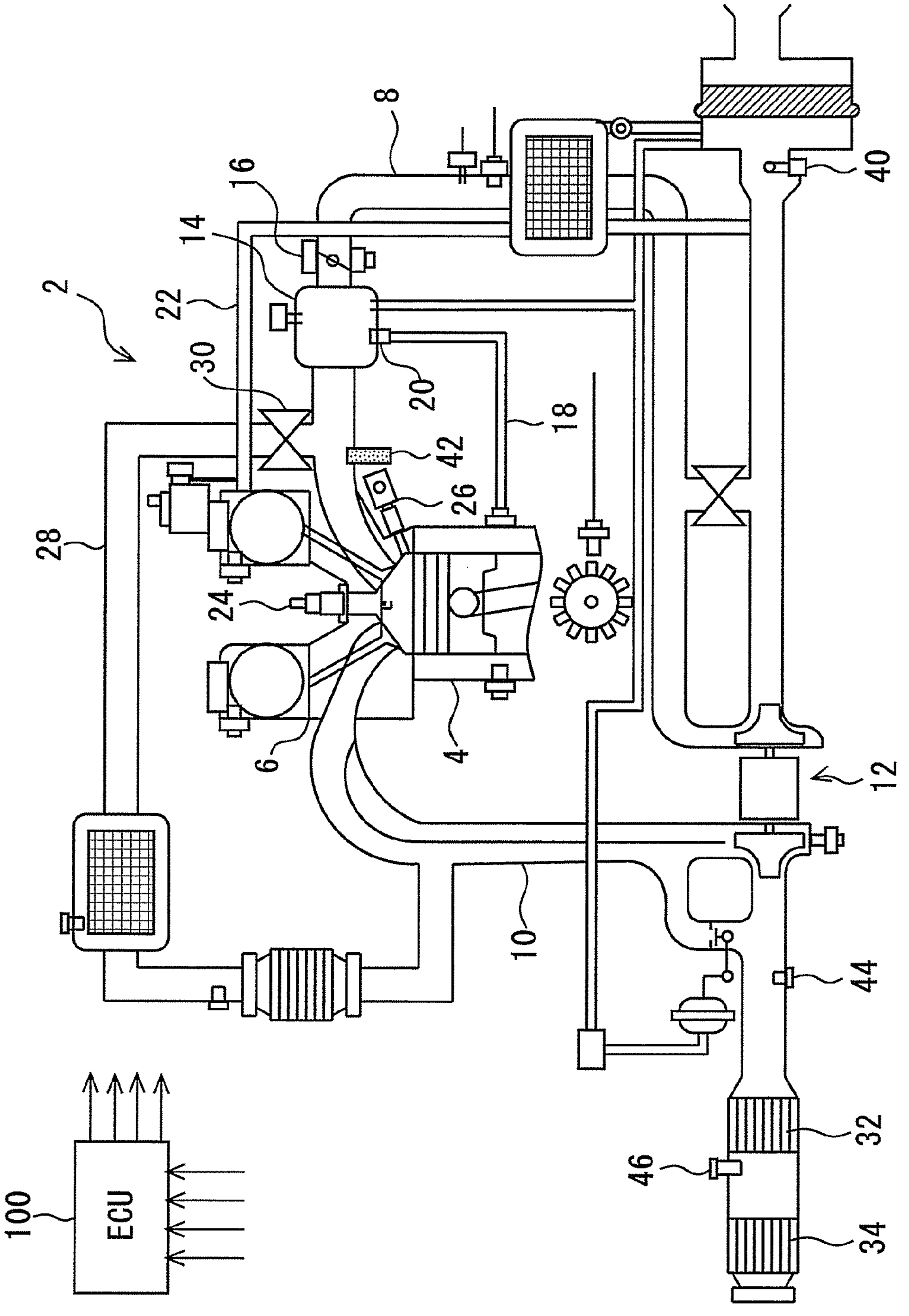
FIG. 1 is a system diagram of an internal combustion engine to which the present invention is applied.

FIG. 1 is a diagram showing a system configuration of an internal combustion engine to which a control device of the embodiment of the present invention is applied. An internal combustion engine 2 according to the present embodiment is a spark ignition four-stroke reciprocating engine (hereinafter, simply called an engine) including an ignition device 24. Further, the engine 2 of the present embodiment is also a direct-injection engine which directly injects a fuel into a cylinder by a cylinder injector 26, and is also a turbo engine including a turbo supercharger 12 which compresses fresh air by using the energy of an exhaust gas.

The engine 2 of the present embodiment includes two blowby gas recirculation passages 18 and 22. One blowby gas recirculation passage 18 is a gas passage which connects an inside of a cylinder block 4 and a downstream side from a throttle 16 in an intake passage 8, in more detail, the inside of the cylinder block 4 and a surge tank 14, and is provided with a PCV valve 20 in the vicinity of a connection portion with the surge tank 14. The other blowby gas recirculation passage 22 is a gas passage which connects an inside of a cylinder head 6 and an upstream side from the throttle 16 in the intake passage 8, in more detail, the inside of the cylinder head 6 and an upstream side from the turbo supercharger 12 in the intake passage 8, and is not provided with a check valve like the PCV valve 20.

Further, the engine 2 of the present embodiment includes an EGR passage 28 for recirculating an exhaust gas to the intake passage 8 from an exhaust passage 10. The EGR passage 28 is provided with an EGR valve 30. A connection position of the EGR passage 28 with the intake passage 8 is set at a downstream side from the connection position of the blowby gas recirculation passage 18 with the intake passage 8.

A control system of the engine 2 of the present embodiment includes an ECU 100 as a control device. The ECU 100 is a control device which generally controls the entire system of the engine 2. Actuators such as the aforementioned ignition device 24, cylinder injector 26, PCV valve 20 and EGR valve 30 are connected to an output side of the ECU 100, and sensors such as an air flowmeter 40, an air-fuel ratio sensor 44, an $O_2$ sensor 46 and a NOx sensor 42 are connected to an input side of the ECU 100. The air flowmeter 40 is provided at an inlet port of the intake passage. The air-fuel ratio sensor 44 and $O_2$ sensor 46 are both provided at the exhaust passage 10. The air-fuel ratio sensor 44 is disposed at a further upstream side from an upstream side three-way catalyst 32, and the $O_2$ sensor 46 is disposed between the upstream side three-way catalyst 32 and a downstream side three-way catalyst 34. The mounting position of the NOx sensor 42 is one feature of the present embodiment, and is set at a downstream side from the connection position of the intake passage 8 with the blowby gas recirculation passage 18, more accurately, at a downstream side from the connection position of the intake passage 8 with the EGR passage 28. The ECU 100 operates each of the actuators in accordance with a predetermined control program by receiving a signal from each of the sensors. A number of other actuators and sensors connected to the ECU 100 are also present as shown in the drawing, but the explanation of them will be omitted in the present description.

One of the engine controls performed by the ECU 100 is air-fuel ratio feedback control for matching an exhaust air-fuel ratio with a target air-fuel ratio. In the air-fuel ratio feedback control by the ECU 100, a basic amount of a fuel injection amount is firstly calculated based on a mass flow rate of fresh air which is measured from the signal of the air flowmeter 40 and a theoretical air-fuel ratio which is the target air-fuel ratio. Subsequently, the exhaust air-fuel ratio is measured from the signal of the air-fuel ratio sensor 44 and the signal of the $O_2$ sensor 46, and a correction amount of the fuel injection amount is calculated based on a deviation of the exhaust air-fuel ratio and the target air-fuel ratio. A blowby gas which is recirculated to the intake passage 8 influences the correction amount of the fuel injection amount which is thus calculated. More specifically, the blowby gas contains HC, and therefore, the correction amount is set to reduce the fuel injection amount from the cylinder injector 26 correspondingly. As the amount of HC contained in a blowby gas is larger, the reduction correction amount of the fuel injection amount is set as a larger value.

Further, the ECU 100 includes a function of measuring the mass flow rate of NOx which is recirculated to the intake passage 8 with a blowby gas. FIG. 2 is a block diagram of the case of paying attention to such a function of the ECU 100. The ECU 100 takes in the respective signals from the NOx sensor 42 and the air flowmeter 40, and obtains the mass flow rate of NOx by processing the signals from them.

Figure 2:
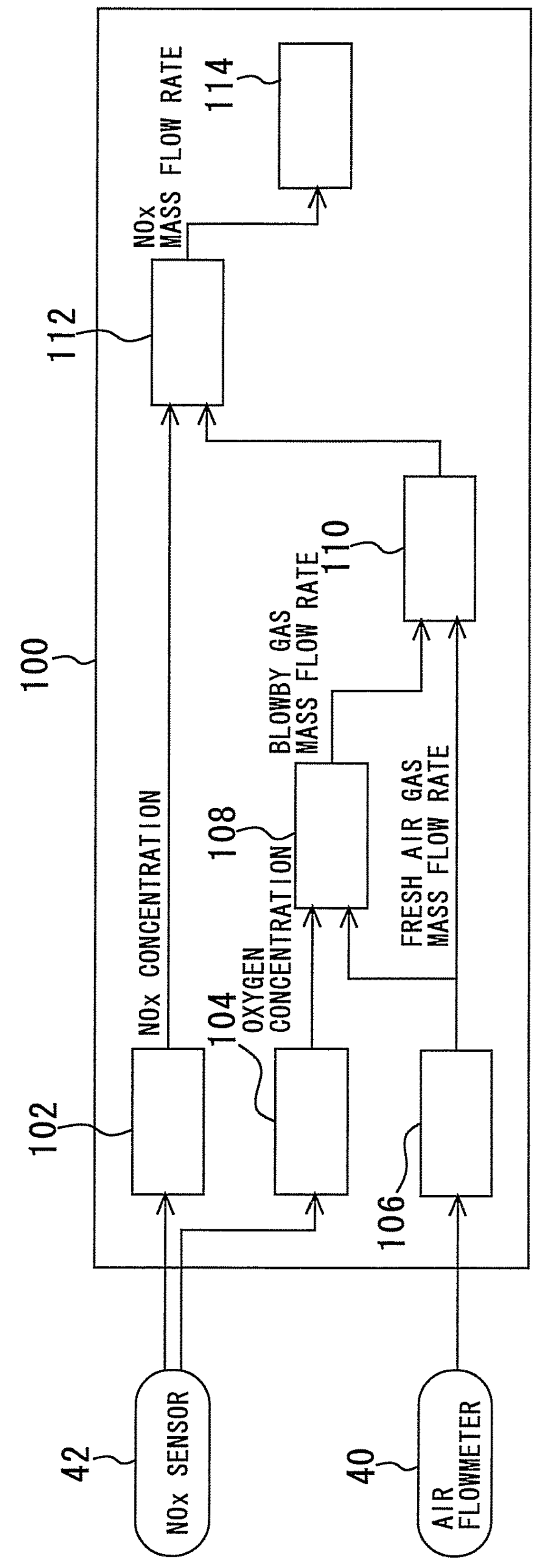
FIG. 2 is a block diagram showing a configuration of a control device as an embodiment of the present invention.

In FIG. 2, the ECU 100 is expressed by the combination of seven signal processing units 102, 104, 106, 108, 110, 112 and 114. These signal processing units each may be configured by exclusive hardware, or may share hardware and may be virtually configured by software. Hereinafter, the function as the measuring device of the ECU 100 will be described for each signal processing unit.

The signal processing unit 102 takes in the signal of the NOx sensor 42, and converts the signal into NOx concentration in the intake passage 8. The signal processing unit 104 similarly takes in the signal of the NOx sensor 42, and converts the signal into the oxygen concentration in the intake passage 8. From the ordinary NOx sensor 42, the signal corresponding to the NOx concentration and the signal corresponding to the oxygen concentration can be simultaneously obtained. The signal processing unit 106 takes in the signal of the air flowmeter 40, and converts the signal into the mass flow rate of fresh air taken into the intake passage 8.

The signal processing unit 108 calculates the mass flow rate of the blowby gas which is recirculated to the intake passage 8 based on the oxygen concentration and the mass flow rate of the fresh air. When the oxygen concentration in the intake passage 8 is set as O2in, the mass flow rate of the fresh air is set as Ga, and the mass flow rate of the blowby gas is set as Gb, the correlation of them is expressed by the following formula (1). However, formula (1) is on the precondition that the air-fuel ratio is controlled to be stoichiometry by air-fuel ratio feedback control. In the situation where the air-fuel ratio is controlled to be stoichiometry, the amount of oxygen contained in the blowby gas becomes almost zero. Meanwhile, the amount of the oxygen contained in the fresh air can be considered to be always 20% and constant.

[Formula 1]

$$\text{O2in}[\%] = \frac{20[\%] \times Ga[\text{g/sec}] + 0[\%] \times Gb[\text{g/sec}]}{Ga[\text{g/sec}] + Gb[\text{g/sec}]} \qquad \text{formula (1)}$$

The following formula (2) is the calculation formula of the mass flow rate Gb of the blowby gas obtained by modification of formula (1). The signal processing unit 108 substitutes the oxygen concentration O2in obtained in the signal processing unit 104, and the mass flow rate Ga of the fresh air obtained in the signal processing unit 106 into formula (2).

[Formula 2]

$$Gb[\text{g/sec}] = \left(\frac{20[\%]}{\text{O2in}[\%]} - 1\right) \times Ga[\text{g/sec}] \qquad \text{formula (2)}$$

Note that the blowby gas described here is the gas blowing from the gap between the cylinder and the piston into the crankcase, and is not necessarily the same as the gas flowing in the blowby gas recirculation passages 18 and 22. In the blowby gas recirculation passage 22 without a check valve, the flowing direction of the gas sometimes becomes in the opposite direction. In this case, fresh air (scavenging gas) is taken into the crankcase via the blowby gas recirculation passage 22 from the intake passage 8, and therefore, the blowby gas which is diluted by the fresh air flows into the blowby gas recirculation passage 18. The mass flow rate Gb calculated by formula (2) is not the mass flow rate of all the gases flowing in the blowby gas recirculation passage 18, but is the mass flow rate of only the blowby gas among them.

When the EGR valve 30 is opened, the mass flow rate of the EGR gas which is recirculated to the intake passage 8 is contained in the mass flow rate Gb of the blowby gas calculated by formula (2). The EGR gas has the oxygen concentration of substantially zero similarly to the blowby gas, and therefore, the EGR gas can be included in the blowby gas in formula (2).

The signal processing unit 110 adds up the mass flow rate Ga of the fresh air obtained in the signal processing unit 106, and the mass flow rate Gb of the blowby gas obtained in the signal processing unit 106. The value thus obtained expresses the mass flow rate of all the gases in the intake passage 8.

The signal processing unit 112 calculates the mass flow rate of NOx in the intake passage based on the mass flow rate of all the gases and the NOx concentration. When the NOx concentration in the intake passage 8 is set as NOX, and the mass flow rate of NOx is set as Gnox, the calculation formula of a mass flow rate Gnox of NOx is expressed by the following formula (3). The mass flow rate Gnox calculated by formula (3) is the mass flow rate of NOx which is recirculated to the intake passage 8 with the blowby gas which is generated in the crankcase.

[Formula 3]

$$\text{Gnox [g/sec]} = \text{NOX [\%]} \times (\text{Ga [g/sec]} + \text{Gb [g/sec]}) \qquad \text{formula (3)}$$

When the EGR valve 30 is opened, the mass flow rate of NOx contained in the EGR is contained in the mass flow rate Gnox of NOx calculated by formula (3). The NOx sensor 42 is attached at a downstream side from the connection position of the intake passage 8 with the blowby gas recirculation passage 18, and at a downstream side from the connection position with the EGR passage 28, and therefore, can detect not only NOx contained in the blowby gas, but also all NOx in the intake passage including NOx contained in the EGR gas.

In the present embodiment, the measuring device of the mass flow rate of NOx of the present invention is configured by the signal processing device configured by the above six signal processing units 102, 104, 106, 108, 110 and 112, and the NOx sensor 42 and the air flowmeter 40.

The remaining signal processing unit 114 relates to a diagnosis function which the ECU 100 has. The mass flow rate of NOx obtained in the signal processing unit 112 is inputted in the signal processing unit 114. The signal processing unit 114 diagnoses the state of the engine 2 from the mass flow rate of NOx in accordance with the stored diagnosis program.

The following two diagnoses are performed by the signal processing unit 114. The signal processing unit 114 performs diagnosis 1 first, and when the result of diagnosis 1 is good, the signal processing unit 114 performs diagnosis 2 successively.

Diagnosis 1: Whether the inside of the intake passage 8 is in the state in which a deposit easily accumulates?

Diagnosis 2: Whether fuel dilution of oil in the crankcase is advancing?

In diagnosis 1, the mass flow rate of NOx inputted from the signal processing unit 112 and a predetermined threshold value 1 are compared. Generation of sludge in the intake passage 8 correlates with the mass flow rate of NOx recirculated to the intake passage 8 with the blowby gas, and as the flow rate becomes higher, sludge is easily generated. The aforesaid threshold value 1 is the limit value of the mass flow rate of NOx which is allowed from the viewpoint of generation of sludge. When the mass flow rate of NOx is the threshold value 1 which is an allowable limit or more, the signal processing unit 114 diagnoses that the inside of the intake passage 8 is in the state where a deposit easily accumulates, and starts an actuator operation to suppress a deposit.

The aforesaid actuator operation is performed to reduce generation of NOx. As a concrete example, if the ignition device 24 is operated, the ignition timing is retarded, and if the cylinder injector 26 is operated, the injection timing of the fuel is changed. Both the ignition device 24 and the cylinder injector 26 may be operated. By positively reducing generation of NOx by such an actuator operation, NOx which is recirculated into the intake passage 8 is reduced, and the sludge generated by polymerization reaction of NOx, and oil and a fuel can be suppressed from accumulating in the intake passage 8 as a deposit.

In diagnosis 2, the mass flow rate of NOx and a predetermined threshold value 2 are compared. The threshold value 2 is set as a value smaller than the aforesaid threshold value 1. When the mass flow rate of NOx is the threshold value 2 or less, the reduction correction amount of the fuel injection amount by the air-fuel ratio feedback control and a predetermined threshold value 3 are compared next. When the mass flow rate of NOx which is recirculated to the intake passage 8 with the blowby gas is low, the extent of the fuel dilution of oil can be diagnosed by determining whether the reduction correction amount of the fuel injection amount is large or not. When the fuel dilution of oil advances, the amount of HC evaporated from the oil in the crankcase increases, and polymerization reaction of NOx and HC in the crankcase is promoted. As a result, the amount of NOx in the crankcase becomes small, and the mass flow rate of NOx which is recirculated to the intake passage 8 reduces. The reduction correction amount of the fuel injection amount becomes larger as the amount of HC contained in the blowby gas is larger, more specifically, the amount of HC evaporated from oil in the crankcase is larger, and therefore, if the reduction correction amount of the fuel injection amount becomes large simultaneously with reduction in the mass flow rate of NOx, it can be determined that the fuel dilution of oil is advancing in the engine 2. In this case, a predetermined flag is set, which shows that the fuel dilution of oil is advancing. Meanwhile, if the reduction correction amount of the fuel injection amount does not become large though the mass flow rate of NOx reduces, it can be determined that there is the possibility of another cause, for example, an abnormality in the fuel system.

As described above, the ECU 100 as the control device has the function of measuring the mass flow rate of NOx which is recirculated to the intake passage 8 with the blowby gas, and diagnosing the state of the engine 2 from the value. The ECU 100 also has the function of suppressing a deposit inside the intake passage 8 by arbitrarily operating an actuator such as the ignition device 24 when determining it as necessary from the diagnosis result. A flowchart of FIG. 3 shows such a function of the ECU 100 by one processing flow.

Figure 3:
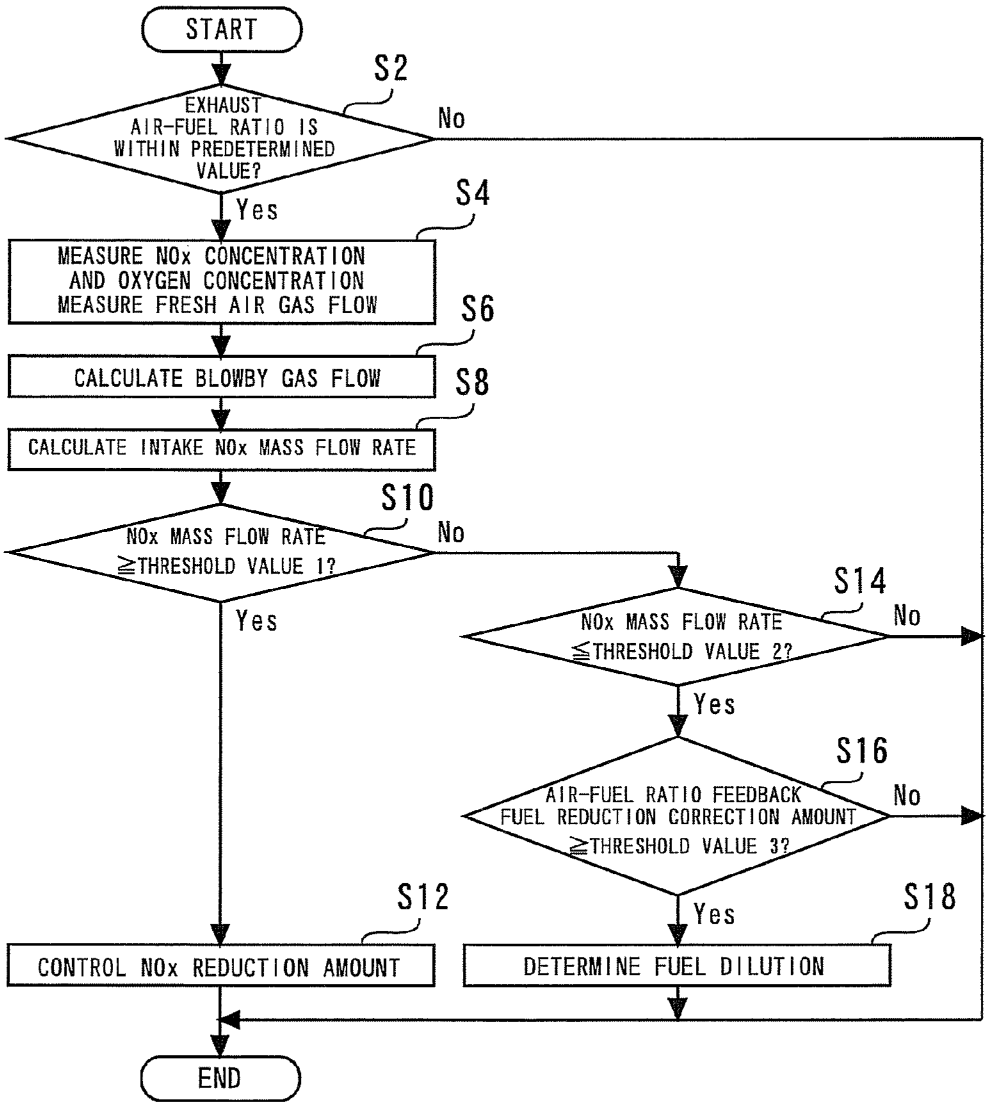
FIG. 3 is a flowchart showing the procedures of a series of processing performed by the control device in the embodiment of the present invention.

According to the flowchart of FIG. 3, in the first step S2, the ECU 100 determines whether or not the exhaust air-fuel ratio is within the predetermined range with the theoretical air-fuel ratio as the center. This is because the aforementioned measuring method of the mass flow rate of NOx is on the precondition that the oxygen amount contained in the blowby gas is almost zero. If the air-fuel ratio feedback control by the ECU 100 is performed, the exhaust air-fuel ratio is within the aforesaid predetermined range.

When the determination result of step S2 is affirmative, the ECU 100 performs processing of the next step S4. In step S4, the ECU 100 measures the NOx concentration and the oxygen concentration in the intake passage 8. Further, the ECU 100 measures the mass flow rate of the fresh air taken in the intake passage 8.

In the next step S6, the ECU 100 calculates the mass flow rate of the blowby gas which is recirculated to the intake passage 8 based on the oxygen concentration and the mass flow rate of the fresh air. For the calculation, the aforesaid formula (2) is used.

In the next step S8, the mass flow rate of all the gases in the intake passage 8 is calculated based on the mass flow rate of the fresh air and the mass flow rate of the blowby gas, and subsequently calculates the mass flow rate of NOx in the intake passage 8 based on the mass flow rate of all the gases and the NOx concentration. For the calculation, the aforesaid formula (3) is used.

In the next step S10, the ECU 100 determines whether or not the mass flow rate of Nox calculated in step S8 is the predetermined value 1 or more. When the mass flow rate of NOx is the threshold value 1 or more, the ECU 100 performs processing of the next step S12. In step S12, the ECU 100 carries out angle retardation of the ignition timing as the control for reducing NOx which is recirculated into the intake passage 8.

Meanwhile, when the mass flow rate of NOx is smaller than the threshold value 1, the ECU 100 performs determination of the next step S14. In step S14, the ECU 100 determines whether or not the mass flow rate of NOx calculated in step S8 is a predetermined threshold value 2 or less. When the mass flow rate of NOx is the threshold value 2 or less, the ECU 100 further performs the determination of step S16.

In step S16, the ECU 100 determines whether or not the reduction correction amount of the fuel injection amount determined in the air-fuel ratio feedback control is a predetermined threshold value 3 or more. When the reduction correction amount is not less than the threshold value 3, the ECU 100 performed processing of the next step S18. In step S18, the ECU 100 determines that the fuel dilution of oil in the crankcase is advancing, and sets the flag showing that the fuel dilution of oil is advancing.

The embodiment of the present invention is described above, but the present invention is not limited to the aforementioned embodiment, and can be carried out by being modified variously in the range without departing from the gist of the present invention. For example, in the aforementioned embodiment, the NOx concentration and the oxygen concentration are measured by using one NOx sensor, but they can be separately measured by using respective exclusive sensors.

Further, in the aforementioned embodiment, the blowby gas recirculation passage 18 with the PCV valve is connected to the cylinder block 4, but may be connected to the cylinder head 6. Further, the blowby gas recirculation passage 22 may be omitted.

DESCRIPTION OF REFERENCE NUMERALS

2 Engine
4 Cylinder block
6 Cylinder head
8 Intake passage
10 Exhaust passage
14 Surge tank
16 Throttle
18. Blowby gas recirculation passage
20 PCV valve
22 Blowby gas recirculation passage
24 Ignition device
26 Cylinder injector
28 EGR passage
40 Air flowmeter
42 NOx sensor
44 Air-fuel ratio sensor
46 $O_2$ sensor
100 ECU

The invention claimed is:

1. A measuring device that is a device for measuring a mass flow rate of NOx recirculated to an intake passage with a blowby gas in an internal combustion engine in which the blowby gas is recirculated to the intake passage, comprising:

a NOx sensor attached to a downstream side from a position where the blowby gas is recirculated in said intake passage;

an air flowmeter attached to an inlet port of said intake passage; and a signal processing device that processes each of signals from said NOx sensor and air flowmeter, wherein said signal processing device includes:

a NOx concentration measuring unit that converts a signal from said NOx sensor into a NOx concentration;

an oxygen concentration measuring unit that converts the signal from said NOx sensor into an oxygen concentration;

a fresh air mass flow rate measuring unit that converts a signal from said air flowmeter into a mass flow rate of fresh air;

a blowby gas mass flow rate calculating unit that calculates a mass flow rate of the blowby gas recirculated to said intake passage from the oxygen concentration and the mass flow rate of the fresh air;

an all gas mass flow rate calculating unit that calculates a mass flow rate of all gases in said intake passage from the mass flow rate of the fresh air and the mass flow rate of the blowby gas; and a NOx mass flow rate calculating unit that calculates a mass flow rate of NOx in said intake passage from the mass flow rate of all the gases and the NOx concentration.

2. A control device for an internal combustion engine in which a blowby gas is recirculated to an intake passage, comprising:

NOx concentration measuring means that measures a NOx concentration in said intake passage downstream from a position where the blowby gas is recirculated;

oxygen concentration measuring means that measures an oxygen concentration in said intake passage downstream from the position where the blowby gas is recirculated;

fresh air mass flow rate measuring means that measures a mass flow rate of fresh air taken into said intake passage;

blowby gas mass flow rate calculating means that calculates a mass flow rate of the blowby gas recirculated to said intake passage from the oxygen concentration and the mass flow rate of the fresh air;

all gas mass flow rate measuring means that measures a mass flow rate of all gases in said intake passage from the mass flow rate of the fresh air and the mass flow rate of the blowby gas;

NOx mass flow rate calculating means that calculates a mass flow rate of NOx in said intake passage from the mass flow rate of all the gases and the NOx concentration; and diagnosis means that diagnoses a state of said internal combustion engine based on the mass flow rate of NOx.

3. The control device for an internal combustion engine according to claim 1, wherein said diagnosis means includes NOx reducing means that operates an actuator of said internal combustion engine to reduce generation of NOx when the mass flow rate of NOx is a predetermined value or more.

4. The control device for an internal combustion engine according to claim 3, wherein said control device further comprises:

exhaust air-fuel ratio measuring means that measures an air-fuel ratio of an exhaust gas;

fuel injection amount calculating means that calculates a fuel injection amount from the mass flow rate of the fresh air and a target air-fuel ratio; and correction amount calculating means that calculates a correction amount of the fuel injection amount from a deviation of the exhaust air-fuel ratio and the target air-fuel ratio, wherein said diagnosis means includes means that determines whether or not a reduction correction amount of the fuel injection amount is a predetermined value or more when the mass flow rate of NOx is a predetermined value or less, and diagnoses a state of said internal combustion engine based on the determination result.

5. The control device for an internal combustion engine according to claim 3, wherein said NOx concentration measuring means measures a NOx concentration in said intake passage by one NOx sensor shared by said oxygen concentration measuring means, and said oxygen concentration measuring means measures an oxygen concentration in said intake passage by said NOx sensor.

6. The control device for an internal combustion engine according to claim 2, wherein said control device further comprises:

exhaust air-fuel ratio measuring means that measures an air-fuel ratio of an exhaust gas;

fuel injection amount calculating means that calculates a fuel injection amount from the mass flow rate of the fresh air and a target air-fuel ratio; and correction amount calculating means that calculates a correction amount of the fuel injection amount from a deviation of the exhaust air-fuel ratio and the target air-fuel ratio, wherein said diagnosis means includes means that determines whether or not a reduction correction amount of the fuel injection amount is a predetermined value or more when the mass flow rate of NOx is a predetermined value or less, and diagnoses a state of said internal combustion engine based on the determination result.

7. The control device for an internal combustion engine according to claim 6, wherein said NOx concentration measuring means measures a NOx concentration in said intake passage by one NOx sensor shared by said oxygen concentration measuring means, and said oxygen concentration measuring means measures an oxygen concentration in said intake passage by said NOx sensor.

8. The control device for an internal combustion engine according to claim 2, wherein said NOx concentration measuring means measures a NOx concentration in said intake passage by one NOx sensor shared by said oxygen concentration measuring means, and said oxygen concentration measuring means measures an oxygen concentration in said intake passage by said NOx sensor.

9. A control device for an internal combustion engine in which a blowby gas is recirculated to an intake passage, comprising:

a NOx concentration measuring unit that measures a NOx concentration in said intake passage downstream from a position where the blowby gas is recirculated;

an oxygen concentration measuring unit that measures an oxygen concentration in said intake passage downstream from the position where the blowby gas is recirculated;

a fresh air mass flow rate measuring unit that measures a mass flow rate of fresh air taken into said intake passage;

a blowby gas mass flow rate calculating unit that calculates a mass flow rate of the blowby gas recirculated to said intake passage from the oxygen concentration and the mass flow rate of the fresh air;

an all gas mass flow rate measuring unit that measures a mass flow rate of all gases in said intake passage from the mass flow rate of the fresh air and the mass flow rate of the blowby gas;

a NOx mass flow rate calculating unit that calculates a mass flow rate of NOx in said intake passage from the mass flow rate of all the gases and the NOx concentration; and a diagnosis unit that diagnoses a state of said internal combustion engine based on the mass flow rate of Nox.

* * * * *

UNITED STATES PATENT AND TRADEMARK OFFICE

CERTIFICATE OF CORRECTION

PATENT NO. : 8,469,010 B2
APPLICATION NO. : 13/000046
DATED : June 25, 2013
INVENTOR(S) : Inoue It is certified that error appears in the above-identified patent and that said Letters Patent is hereby corrected as shown below:

In the Specification

After the Title, at column 1, line 6:
Insert --This is a 371 national phase application of PCT/JP2010/051153 filed 28 January 2010, the content of which is incorporated herein by reference.--.

Signed and Sealed this
Tenth Day of September, 2013

Teresa Stanek Rea
*Acting Director of the United States Patent and Trademark Office*